(12) United States Patent
Qutami

(10) Patent No.: US 11,737,603 B1
(45) Date of Patent: Aug. 29, 2023

(54) GRINDING DEVICE HAVING SECTIONS COUPLED BY AN INTERNAL INTERCONNECTED MAGNETIC POST

(71) Applicant: Faris Qutami, Phoenix, AZ (US)

(72) Inventor: Faris Qutami, Phoenix, AZ (US)

( * ) Notice: Subject to any disclaimer, the term of this patent is extended or adjusted under 35 U.S.C. 154(b) by 0 days.

(21) Appl. No.: 17/723,964

(22) Filed: Apr. 19, 2022

(51) Int. Cl.
*A47J 42/14* (2006.01)
*A47J 42/20* (2006.01)
*A47J 42/38* (2006.01)

(52) U.S. Cl.
CPC ............... *A47J 42/14* (2013.01); *A47J 42/20* (2013.01); *A47J 42/38* (2013.01)

(58) Field of Classification Search
CPC ............ A47J 42/14; A47J 42/20; A47J 42/38
See application file for complete search history.

(56) References Cited

U.S. PATENT DOCUMENTS

| 9,681,777 | B1* | 6/2017 | Dukat | B02C 18/18 |
| 2018/0126386 | A1* | 5/2018 | Witko | B02C 18/16 |
| 2021/0007555 | A1* | 1/2021 | Smith | A47J 42/38 |

OTHER PUBLICATIONS

Hexagon Wood Food Spice Herb Grinder Wooden 2, retrieved date Mar. 19, 2023.*
Axial definition; retrieved date Mar. 23, 2023.*

* cited by examiner

*Primary Examiner* — Matthew Katcoff
*Assistant Examiner* — Mohammed S. Alawadi
(74) *Attorney, Agent, or Firm* — Prudens Law LLC; Shawn Diedtrich

(57) ABSTRACT

A grinding device is composed of sections with varying functionality coupled together and configured to be interconnected through magnets arranged axially within the sections that constitute the device. The coupling of the sections creates chambers that perform grinding, screening, collection, and storage functions within the device. The axial arrangement of the magnets and supporting structures within the section enable easy assembly and disassembly of sections, remove the need for threading, enhance gripping for those with hand issues, and provide for changing the functionality of the device through the interchangeable sections.

20 Claims, 6 Drawing Sheets

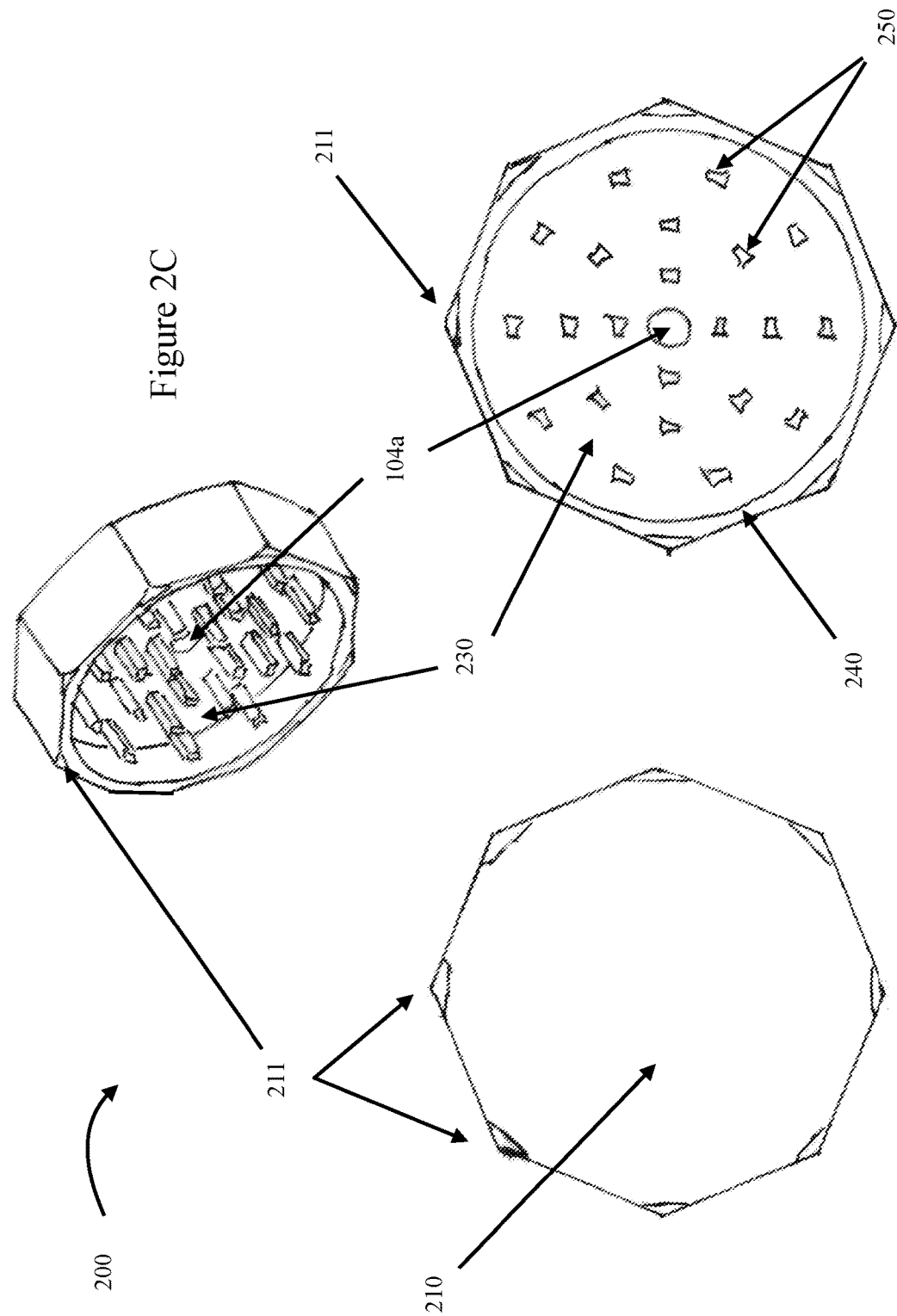

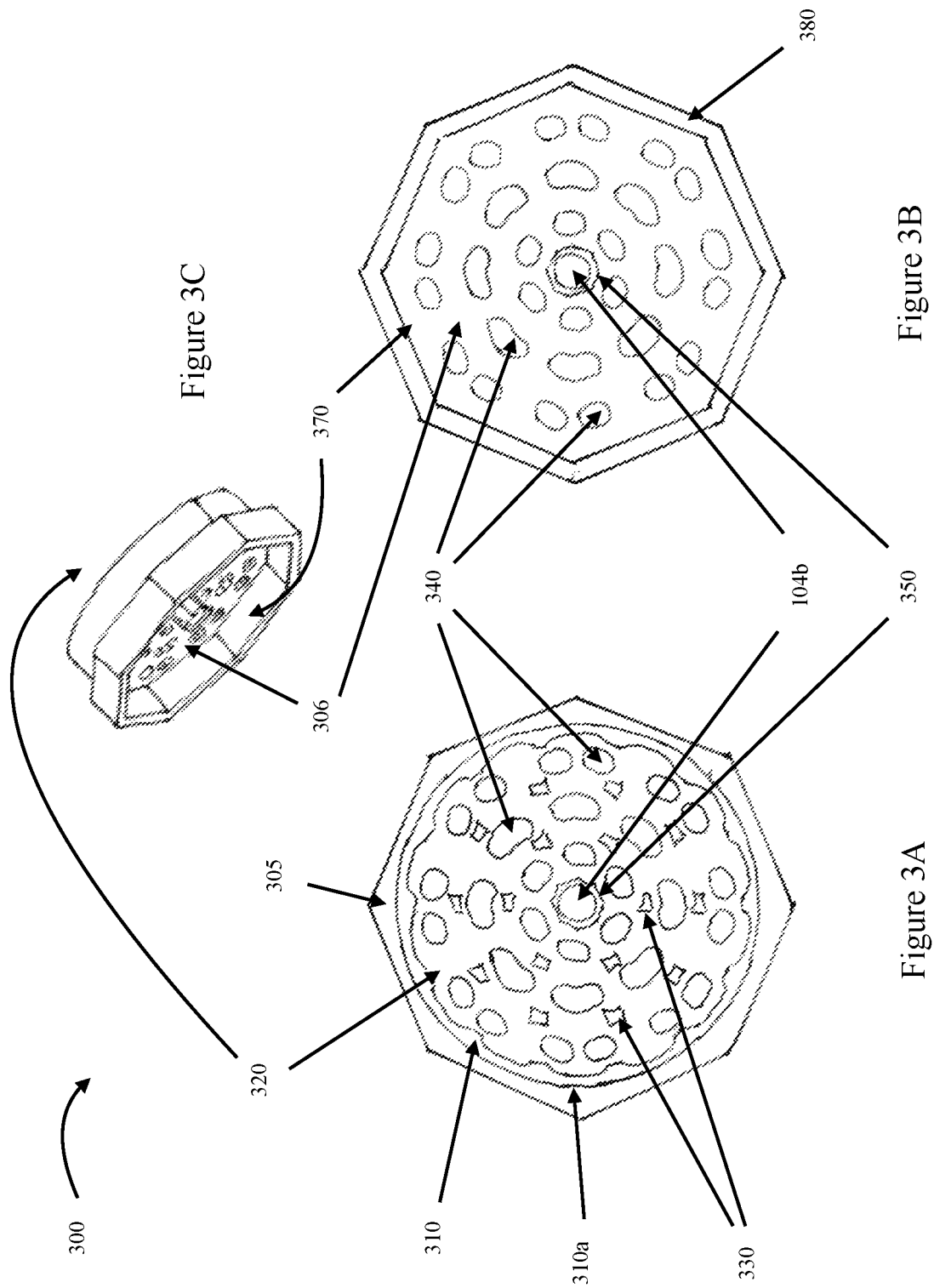

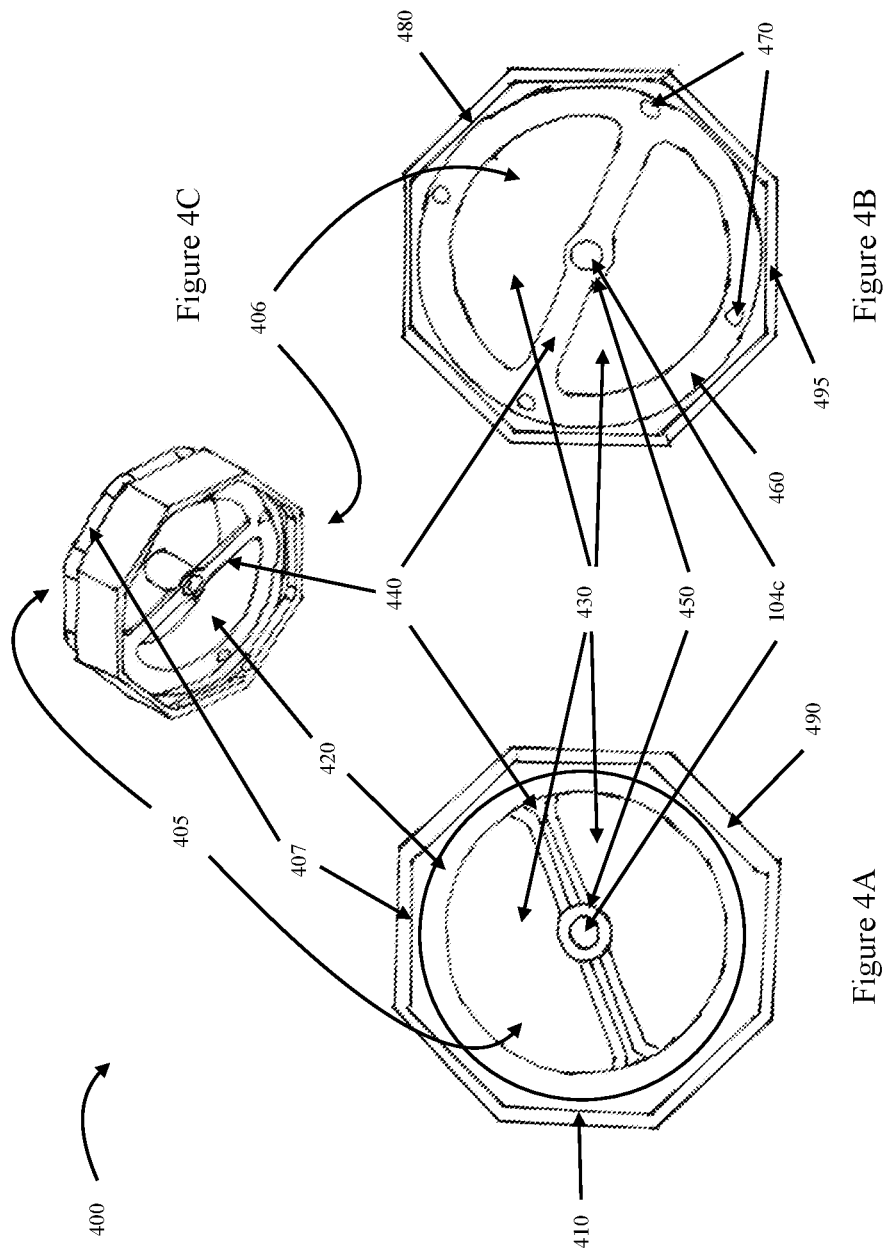

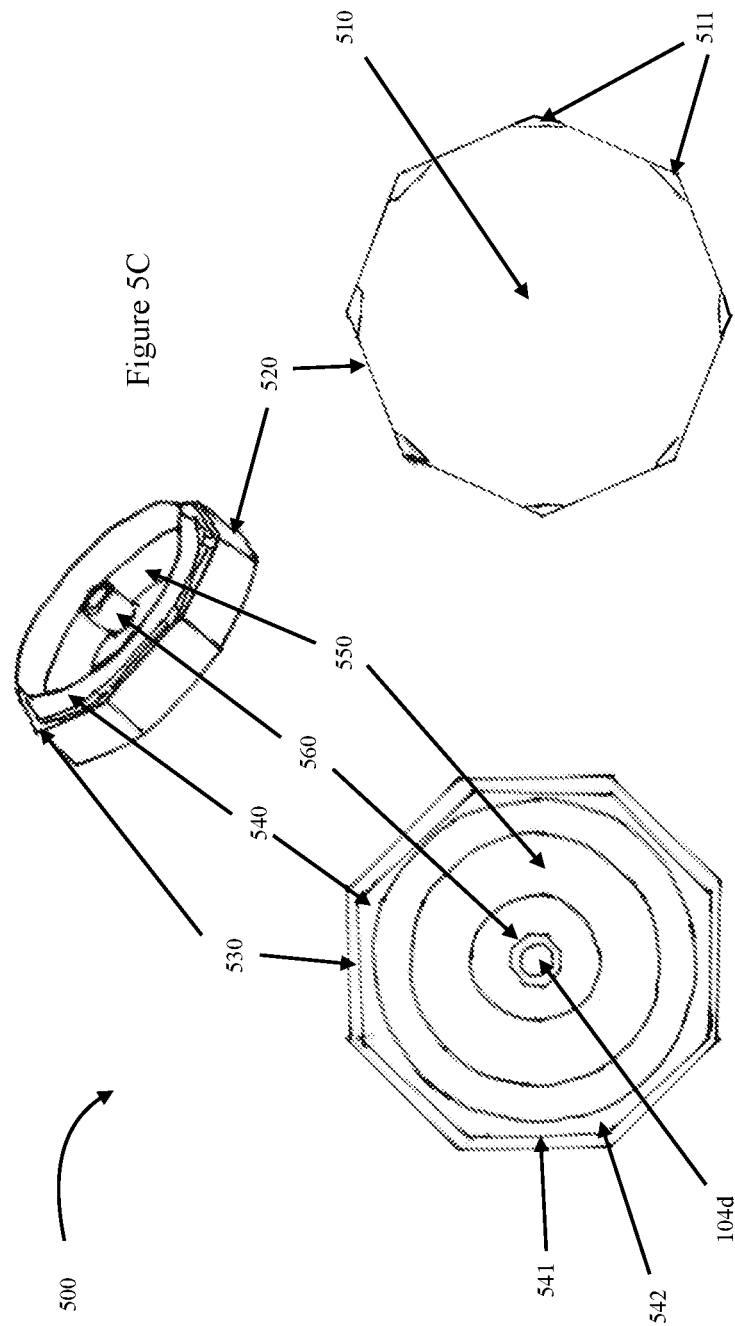

GRINDING DEVICE HAVING SECTIONS COUPLED BY AN INTERNAL INTERCONNECTED MAGNETIC POST

TECHNICAL FIELD

The present invention is generally related to grinders for grinding herbs, spices, plant matter, medications, coffee, and the like.

BACKGROUND

Spices, herbs, or other types of plant matter, medications, coffee, and similar contents are commonly ground using electric or manual grinders. Handheld grinders are typically used to grind small quantities of matter and are ubiquitous. Many grinders have taken a variety of forms but, in general, are cylinder-like in shape and are multi-pieced apparatuses—from 2 piece to four or five pieced sections. A key factor for a handheld grinder is for at least one section to be able to rotate to create the grinding action while the other sections of the grinding device are prevented from rotating. Thus, one must be able to grip the device sufficiently with one hand and rotate with the other to create the grinding motion. To make such an operation comfortable or easy on the hands, prior art devices typically enable one section to rotate and then use threads or threading on the other sections so that they remain in place during operation.

One of the issues of these prior art devices is that the device's threading may prevent easy opening of the device to those with hand problems, or the threading itself may become damaged rendering the device useless for its purpose. Another issue is that manufacturing such a device requires equipment to cut threads in each section that is not a rotatable section. Yet another issue is that increasing the size of a particular section usually increases the number of threads needed to secure each section within the device. Likewise, a larger cross section for a device means more material needed to create the increased thread circumference. Moreover, adding or removing additional functionality, e.g., more sections, requires the time-consuming process of unthreading the sections, and re-threading, which again is difficult for users with hand or handling issues. So, increasing the functionality of the device, for example, adding another section that performs an added function must consider the added threading cost as well as considering whether the device can be gripped easily.

What is needed is a system and method that reduces or eliminates the need for threading, easily enables additional functionality, and is easy operate, assemble, disassemble, and maintain.

SUMMARY

While the way in which the present invention addresses the disadvantages of the prior art will be discussed in greater detail below, in general, the present invention provides for a grinding device that is composed of interchangeable sections with varying functionality coupled together and configured to be interconnected through magnets arranged axially within the sections that constitute the device. The axial arrangement of the magnets and supporting structures within the sections enable easy assembly and disassembly of sections, remove the need for threading, enhance gripping for those with hand issues, and provide for changing the functionality of the device through the interchangeable sections.

A grinding device may include a top and bottom section and a plurality of middle sections to provide for grinding, screening, collecting and/or storing the ground contents. As will be described in detail below, the top section has a cavity with a plurality of teeth extending from the top of the cavity. A second section has a cavity with a plurality of teeth that are reciprocal to the top section's teeth. The second section also has a plurality of holes to allow the ground content to fall into the screening chamber. The third section gathers the contents and screens the contents enabling only particles of a desired size to fall through the screen into the collection and/or storage chamber, which is a cavity within the fourth section.

The sections are interconnected into one unit through a plurality of magnets in each section. The magnets are secured in each section such that when the separate sections are assembled, the magnets couple the sections together to allow operation of the grinding device. The magnet strength is strong enough to keep the sections together during operation and storage but enables the unit to easily be taken apart to dislodge contents or for cleaning. The magnetic system also enables the ability to increase or decrease the functionality of the device, even after purchase, because of the axially placement of the magnets within each section. For example, if a user wants additional screening or grinding, the magnetic system enables adding or swapping out one or more sections to change the device to the desired functionality.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description or may be learned by the practice of the invention.

BRIEF DESCRIPTION OF THE DRAWINGS

To describe the way the advantages and features of the present invention can be obtained, a more particular description of the present invention will be rendered by reference to specific embodiments and examples, which are illustrated in the appended drawings. Understanding that these drawings depict only typical embodiments of the invention and are not therefore to be limiting of its scope, the present invention will be described and explained with additional specificity and detail using the accompanying drawings in which:

FIG. 2A is a top view of a top grinding section of the grinding chamber of a grinding device having sections coupled by an internal interconnected magnetic post.

FIG. 2B is a bottom view of a top grinding section of the grinding chamber of a grinding device having sections coupled by an internal interconnected magnetic post.

FIG. 2C is a bottom perspective view of a top grinding section of the grinding chamber of a grinding device having sections coupled by an internal interconnected magnetic post.

FIG. 3A is a top view of a bottom grinding section of the grinding chamber of a grinding device having sections coupled by an internal interconnected magnetic post.

FIG. 3B is a bottom view of a bottom grinding section of the grinding chamber of a grinding device having sections coupled by an internal interconnected magnetic post.

FIG. 3C is a bottom perspective view of a bottom grinding section of the grinding chamber of a grinding device having sections coupled by an internal interconnected magnetic post.

FIG. 4A is a top view of a screening section without a screen of a grinding device having sections coupled by an internal interconnected magnetic post.

FIG. 4B is a bottom view of a screening section without a screen of a grinding device having sections coupled by an internal interconnected magnetic post.

FIG. 4C is a bottom perspective view of a screening section without a screen of a grinding device having sections coupled by an internal interconnected magnetic post.

FIG. 5A is a top view of a collection section of a grinding device having sections coupled by an internal interconnected magnetic post.

FIG. 5B is a bottom view of a collection section of a grinding device having sections coupled by an internal interconnected magnetic post.

FIG. 5C is a top perspective view of a collection section of a grinding device having sections coupled by an internal interconnected magnetic post.

DETAILED DESCRIPTION

Figure 1:
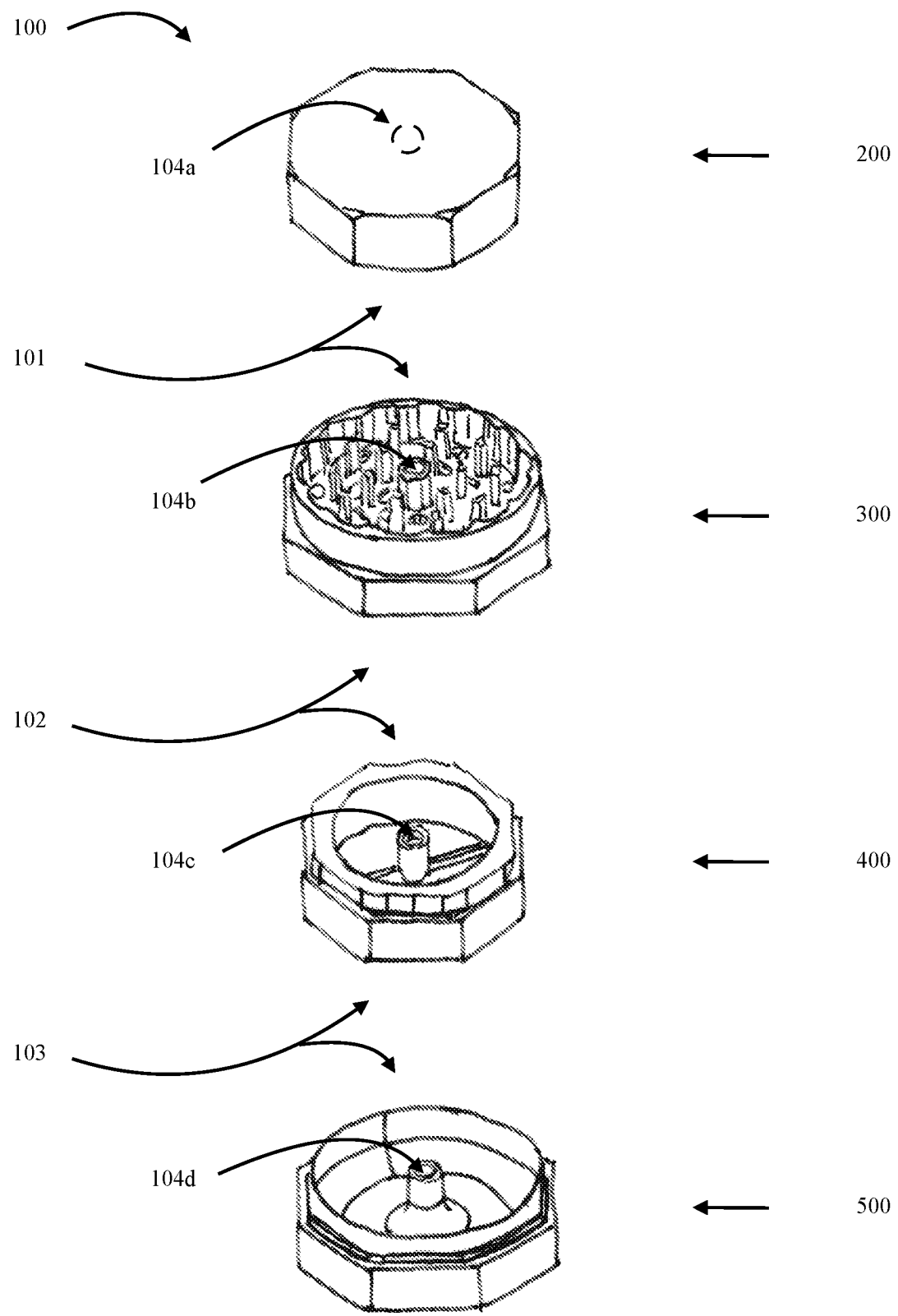
FIG. 1 is an exploded view of a grinding device having sections coupled by an internal interconnected magnetic post.

Various embodiments of the invention are described in detail below. While specific implementations involving a grinding device having a magnetic internal post (referred to sometimes hereinafter as "a grinding device") are described, the description is merely illustrative and not intended to limit the scope of the various aspects of the invention. A person skilled in the relevant art will recognize that other components and configurations may be easily used or substituted than those that are described without parting from the spirit and scope of the invention. As will be appreciated by one of ordinary skill in the art, the device may be embodied as a customization of an existing system, an add-on product, and/or a stand-alone system.

As will become apparent from the following descriptions, the invention, in its various embodiments, includes sections with varying functionality configured to be interconnected through magnets arranged axially within the sections that constitute the device. Sections of the device may enable functionality alone or in concert with other section coupled to each other through the internal interconnected magnetic post. Through the choice and proper coupling of multiple sections, various chambers within the device are created. This method of assembling various sections enables the device to add or delete functionality increasing its usefulness and preventing obsolescence as new sections can be created and offered after initial purchase of the device.

Various exemplary embodiments of the handheld grinding device include a grinding chamber, a screening chamber, and a collection/storage chamber. However, other embodiments of the device may utilize more or less chambers depending on the intended use. In some embodiments, when the handheld grinding device is assembled, a grinding chamber, screening chamber, and collection chamber is formed.

In these embodiments, the grinding chamber is formed through the interconnection of a grinding top section and a grinding bottom section. The screening chamber is formed by interconnection of the screening section to the grinding bottom section. Optionally, a screen may be used further filter the contents from the grinding chamber. In various embodiments, the screen may be connected to the top or bottom of the screening section, the top of the collection section, or the bottom of the grinding section. In some embodiments, multiple screens may be employed and connected to the various sections depending on the intended use. The collection chamber is formed by interconnection of the screening section to the collection section.

In its embodiments, a plurality of sections is configured to accept one or more magnets for connecting the sections of the handheld grinding device. When the handheld grinding device is assembled, the device appears to have a post arranged internally and axially from the top grinding section to the collection section. The individual magnets' strength prevents separation during operation (e.g., rotating the top grinding section), but also enables easy separation of the sections for retrieval, cleaning, storage, etc. Each magnet may have a differing magnetic strength to suit an individual section's purpose (e.g., slighter weaker magnet strength employed in the grinding section while having a stronger magnetic connection between the screening and collection sections).

The magnets may be held in place using various configurations depending on the section. In some embodiments, a magnet may be held in place solely due to the magnetic attraction of the magnet and the metal surface of a section. In other embodiments, a magnet may be placed within a structure connected to one or more of the sections. In some embodiments, the structure may be a cylinder (or some other suitable shape) attached to one surface of a section. Then, a magnet is placed within the structure. The magnets may be exposed, partially covered, or fully covered if the attraction between each section prevents separation of the sections during operation while also enabling separation of the sections for other purposes consistent with the use of the device.

In its various embodiments, each section may employ a different technique for connecting the magnet to the section. For example, a first section may be configured to secure the magnet flush with an inner surface of the section (e.g., the inner top surface of the section). A second section may be configured with a cylindrical structure connected to its inner surface such that when the sections are coupled, the first section and the second section magnets are enabled to interconnect. For sections that do not have a surface for such a connection, a support or spar may be configured secure the section's magnet. Such a support may use a cylindrical (or other shaped) structure to secure the magnet.

In its embodiments, various sections of the device are coupled such that the magnets are axially interconnected. When assembled, the interconnection appears as a "post" that runs axially and internally from the top section to the bottom section through the middle or center of the device. Once assembled, the plurality of sections creates a plurality of internal chambers with the internal "post" of magnets interconnecting the sections. The function of a particular chamber depends on the type of section(s) employed to create the chamber.

In some embodiments, a section may participate in the functionality of more than one chamber. As an example, the top of a second section may contain structures that participate with the bottom of a first section in creating a grinding chamber. In this example, the bottom of the second section may contain structures that participate in screening or filtering the ground contents from the grinding chamber. Accordingly, the second section functionality is participating in both grinding and screening contents of the device. In other embodiments, a section may have a singular purpose. For example, one section's structures may provide screening or storage.

In its embodiments, when the grinding device is assembled, the outer edges of each section form a shape. For example, when looking at the top of the assembled device, the shape of the outer edges may form a cylindrical shape, a triangular shape, a hexagon, an octagon, a square, and any other type of shape suitable for the intended purpose. In other embodiments, a first section's outer edge may form a different shape from a second section's outer edge shape. For example, the grinding sections of a device may take the form of a cylinder while other sections may take the form of an octagon or a square. If a section can support an internal magnet and/or magnetic structure to interconnect with adjacent sections, any outer edge shape could be used.

In its embodiments, when the grinding device is assembled, some of the plurality of sections may be allowed to rotate or otherwise move while the other sections are prevented from such movement. Movement is enabled or prevented through the configuration of the various inner and outer edges of the sections. For example, rotation between two sections is enabled by a circular or otherwise rounded inner edge of one section that, when coupled with another section, rotates on the outer edge of that other section. Preventing or limiting movement is enabled by a shape such as a triangle, square, octagon, or the like that when two sections are coupled as above would prevent movement. By the judicious use of shaped walls with a device, functionality can easily be added or removed to the device allowing for multiple rotating sections when needed.

In its embodiments, various chambers may be created depending on the intended use of the device. Some of these chambers are discussed below; however, a person skilled in the relevant art will recognize that other combinations of section configurations may be easily used or substituted than those that are described without parting from the spirit and scope of the invention.

Grinding Chamber

Various embodiments of the handheld grinding device include a grinding chamber. In some embodiments, a grinding chamber comprises a top grinding section and a bottom grinding section. In its embodiments, the top grinding section has an inner cavity comprising a first plurality of teeth extending into the grinding chamber. The inner topside of the bottom grinding section has a second plurality of teeth that when connected also extend into the grinding chamber. The first plurality and the second plurality of teeth are positioned in their respective sections so that as the grinding device is operated, the teeth provide sufficient shearing force between the pluralities of teeth to grind the contents placed within the grinding chamber. Additionally, the pluralities of teeth are also arranged to allow and not interfere with the magnet and/or magnetic structure interconnection between the top and bottom sections.

In its embodiments, the arrangement of the pluralities of teeth attached to the top grinding and bottom grinding section may take a variety of forms suited to the expected contents. For example, the teeth may be arranged in concentric circles. In other embodiments, the teeth may be arranged in a square pattern. Other embodiments may arrange the teeth in a triangular pattern. In yet other embodiments, the teeth may be arranged in a pattern that mimics a business logo or character. Any pattern that can grind the contents to a desired size within the grinding chamber may be used.

In other embodiments, a grinding chamber comprises a first grinding section having a first plurality of teeth and a second plurality of teeth. The second section comprising the bottom of the grinding chamber does not contain teeth. The first plurality of teeth is configured to move (e.g., rotate) while the second plurality of teeth do not. Upon operation of the device (e.g., rotation of a first section), the movement of the first plurality of teeth against the "stationary" teeth create the shearing force to grind the contents in the grinding chamber.

Screening Chamber

Various embodiments of the handheld grinding device include a screening chamber. A screening chamber has a top comprising a plurality of holes allowing sufficiently ground contents to fall into the screening chamber. The number and placement of individual holes depend on the intended use; however, in general, the holes are placed such so that a tooth extending from the top grinding section will eventually pass over one or more holes to enable passage of the ground contents. In some embodiments, the hole pattern will match the tooth pattern of the grinding section. For example, concentrically placed teeth in the grinding section will have concentrically placed holes in the screening section. In other embodiments, the tooth pattern and hole pattern are not matched. However, any number of holes and pattern of holes sufficient to allow ground material to fall into the screening chamber may be used.

Some embodiments may employ a screen to further filter the ground contents. The screen may be made of various well-known materials such as metal, cloth or other well-known materials, and patterns used for filtering or screening. The screen may be positioned anywhere in the chamber depending on intended use. For example, a screen may be positioned at the bottom of the chamber and filter contents after the contents have passed through a plurality of holes in a screening section. In other embodiments, a screen may be positioned before a plurality of holes in a screening section.

In its embodiments, the screen may be attached to the screening section using one or more techniques. In some embodiments, the screen may comprise a magnet positioned axially to interconnect to other sections. In other embodiments, the screen may comprise one or more magnets positioned on the edges of the screen and attached magnetically to a screening section or other section depending on the intended use. In other embodiments, the screen is connected to a support structure wherein the support structure is connected to one or more sections. In an exemplary embodiment, the support structure is a ring with the screen placed within the ring. In some embodiments involving a ring support structure, the ring is magnetically attached to the screening section through one or more magnets placed at the outer edges and/or inner edges of a section.

Collection Chamber

Various embodiments of the handheld grinding device include a collection chamber. A collection chamber comprises one or more sections for collecting the ground contents of the device. In some embodiments, the section comprises a cavity and a magnet, which is attached centrally within the cavity. In other embodiments, the section comprises a magnet support structure connected to the cavity to receive the magnet. In yet other embodiments, a section may be multi-tiered to capture contents at different levels within the chamber. Some embodiments may capture contents depending on the characteristics of the ground contents, for example, particle size.

Storage Chamber

Various embodiments of the handheld grinding device may include one or more optional storage chambers. The storage chamber may comprise one or more sections wherein each section contains a magnet so that the sections may be axially interconnected to the device through the internal post. The sections may comprise one or more cavities or surface spaces for storage purposes. In its embodiments, the storage chamber may store ground or unground contents, paraphernalia such as lighters, matches, scrapers, removal or repair tools, screens, replacement teeth, or replacement magnets.

Multi-Functional Chambers

Various embodiments of the handheld grinding device include chambers that may perform more than one function. For example, a dual-purpose chamber may be able to grind and screen the contents of the device. For example, the sections that create the dual-purpose chamber may include a plurality of teeth configured on either section and a screen that is configured to capture and filter the contents within the one chamber. As another example, a chamber, such as a collection chamber, may also serve as storage for the device.

Although multiple purposes of chambers have been discussed, the functionality of a chamber of the device is not limited by this description. Any functionality within the scope and spirit of the invention may be employed.

Operation

To assemble the grinding device, a plurality of sections is interconnected, in other words, stacked on each other, into a desired order to create the desired chambers. In some embodiments, a grinding chamber, a screening chamber, and a collection chamber can be created by interconnecting a top and bottom grinding section, a screening section, and a collection section by bringing each section's internal magnets axially together into a "stack" of sections. In other embodiments, two grinding chambers, a screening chamber and a collection chamber may be created using multiple grinding sections with a screening section created between the grinding chambers. In yet other embodiments, multiple screening chambers may be created to filter for different sized contents resulting from one or more grinding chambers. Any implementation of section/chamber order is contemplated by this disclosure.

Once assembled and contents are placed in the grinding chamber, the grinding device is operated by rotating the top grinding section (clockwise or counterclockwise). In its embodiments, a section is rotatable if the inner edge of the section is cylindrical and is placed over another section that comprises a cylindrical flange or wall that enables the top section to rotate around the flange. For example, the top section of a grinding chamber comprises a cylindrical inner edge and is placed over a bottom section of a grinding chamber having a cylindrical wall. To grind the contents in the chamber, the top section is rotated.

In its embodiments, rotation of a section is prevented by having an inner edge that is not circular/cylindrically shaped. For example, the inner edge of the bottom of a screening section may be octagonally-shaped and the top of an interconnected section, for example, a collection section would employ an octagonally-shaped flange so that rotation is prevented. Any implementation of a non-circular shape that prevents rotation is contemplated by this disclosure.

Various embodiments may employ one or more rotatable sections depending on the desired use. For example, a grinding device may comprise two separate grinding chambers that require rotation to grind its contents. In such an embodiment, two grinding chambers may be created, each with a top grinding section with a cylindrical inner edge and a bottom section having a cylindrical flange. Another non-rotating section may have a hexagonal flange that may be magnetically coupled with the bottom of one of the grinding sections, but a circular inner edge coupled with the second chamber, which would prevent rotation of the non-rotating section but enable the second grinding section to rotate. In this example, contents could be ground using one type of teeth, get filtered in the next section in the device, and then ground using a second set of teeth for an intended use. In essence, through manipulation of the inner edge shapes and flanges various embodiments may be created because any of the sections utilized are interconnected by an internal axially positioned set of magnets that do not interfere with rotation.

FIG. 1 depicts an exploded view of an exemplary octagonal-shaped embodiment of a grinding device having an internal magnetic post 100. A section 200 having a grinding chamber top is rotatably and releasably coupled to a section 300 having a grinding chamber bottom and a screening chamber top. A section 400 having a screening chamber bottom is releasably coupled to section 300's screening chamber top. A section 500 having a multi-functional collection/storage chamber is releasably coupled to section 400's screening chamber bottom. In this embodiment, when the device 100 is assembled, a grinding chamber 101, a screening chamber 102, and a collection/storage chamber 103 are formed. Each section is interconnected through magnets 104a, 104b, 104c, 104d centrally disposed in a support structure within their respective sections. When assembled, the support structures form an internal column or post. During operation, section 200 is rotated on the top of section 300, which grinds the contents. At the same time, sections 400 and 500 do not rotate. When fully assembled, the device 100 has the appearance of an octagonal-shaped cylinder. However, in its embodiments, any outer shape is contemplated depending to the intended use.

FIGS. 2A and 2B depict an exemplary embodiment of the top and bottom view of a top grinding section 200 of a grinding device having a magnetic internal post 100. FIG. 2C depicts a bottom perspective view of an exemplary embodiment of a top grinding section 200 of a grinding device having a magnetic internal post. In this embodiment, the top grinding section 200 has a top edge 210 that is octagonal in shape and is flat with beveled edges 211 at the points of the octagon. The octagonal shape and beveled edges provide an easier grip, especially for those users with hand or finger strength issues without sacrificing performance of the device. For example, circular shapes require greater squeezing strength so that the fingers can rotate the grinder. The use of an octagonal shape allows more rotational force to be applied to the section while lessening the force needed to apply along a vector towards the center of the device, i.e., less force needed to grip the device in rotation. An outer edge wall 220 maintains its octagonal shape to the bottom of the section, which also has beveled edges 211.

In the exemplary embodiment, the top grinding section 200 has an inner cavity 230 with a circular inner wall 240. Within the inner cavity 230, a plurality of teeth 250 arranged in concentric circles extend from the top of the inner cavity 230. In this exemplary embodiment, the plurality of teeth is arranged in three concentric circles. However, the plurality of teeth may be arranged in any number of concentric circles or other type of shape depending on the desired use. The length of the plurality of teeth 250 extend to the bottom of the section 200. Each tooth resembles a trapezoid in shape with each side of the trapezoid slightly curved inward to create sharp corners that assist with grinding. In this exemplary embodiment, the plurality of teeth 250 are positioned in the same manner, that is, with the short end of the trapezoids facing the same direction when rotated.

In the exemplary embodiment, the top grinding section 200 has a magnet 104a that is secured in a circular cavity in the top of the inner cavity 230. In other embodiments, the magnet may be secured within a cylindrical structure extending from the top of the inner cavity 230 into the inner cavity. In its embodiments, the magnet's 104a position within the cavity is reciprocal to the position of a magnet the section it is to be coupled with. The coupling strength of the magnet 104a may vary; however, the strength should allow for easy rotation of the top grinding section 200 while maintaining sufficient coupling force to keep the coupled section from separating during operation.

FIGS. 3A, 3B, and 3C depict an exemplary embodiment of a top view, bottom view, and perspective view, respectively, of a multi-functional section 300 that participates in the grinding chamber 101 and the screening chamber 102 functionality of an octagonal-shaped embodiment of a grinding device having an internal magnetic post 100. In this embodiment, the top of section 300 has an upper cavity 320 surrounded by a wall 310 that extends perpendicularly from a top surface 305. The outer edge of the wall 310a is circular and is reciprocal to the inner edge the circular inner wall 240 of section 200. When section 200 is coupled to section 300, section 200 glides over wall 310a enabling the grinding action.

Within upper cavity 320, a plurality of teeth 330 arranged in concentric circles extend from the top surface 305. In this exemplary embodiment, the plurality of teeth is arranged in two concentric circles. The plurality of teeth 330 extend to the top of the section 300. Each tooth resembles a trapezoid in shape with each side of the trapezoid slightly curved inward to create sharp corners that assist with grinding. In this exemplary embodiment, the plurality of teeth 330 are positioned in the same manner, that is, with the short end of the trapezoids facing the same direction when rotated. However, the plurality of teeth 330 are positioned such that the short end of the teeth faces the short end of the plurality of teeth 250 when section 200 is placed on section 300.

In this exemplary embodiment, a plurality of holes 340 are arranged in concentric circles in between the plurality of teeth 330 arrangement of concentric circles. The plurality of holes 340 extend through the top surface 305 to the bottom surface 306 so that contents from the grinding chamber 101 may fall through the holes into the screening chamber 102. In this exemplary embodiment, the holes are shown to be of different sizes; however, any size suitable for the intended application of the device are within the spirit and scope of the invention.

In the exemplary embodiment, the section 300 has a magnet 104b that is secured within a cylindrical-like support structure 350 that extends from the upper cavity 320 through the top surface 305 and the bottom surface 306 to a lower cavity 370. In its embodiments, the magnet's position 104b within the cavity is reciprocal to the position of a magnet the section it is to be coupled with. In this exemplary embodiment, the top of magnet 104b is reciprocal to the bottom of magnet 104a and the bottom of magnet 104b is reciprocal to the top of magnet 104c. As indicated above, the coupling strength of the top of magnet 104b should allow for easy rotation of the top grinding section 200 while maintaining sufficient coupling force to keep the coupled section from separating during operation.

Though this exemplary embodiment shows a single magnet 104b within a cylindrical-like structure that "passes through" the top surface 305 and bottom surface 306, it is contemplated that more than one magnet and/or more than one support structure may be utilized depending on the intended use. For example, it may be desired to provide a greater or weaker coupling strength on one side of the section.

Continuing with the exemplary embodiment, an octagonal wall 380 extends from the bottom surface 306, which creates the inner cavity 370. The inner edge of the octagonal wall is reciprocal to the top of section 400. In other embodiments, the inner edge of the wall may be a different shape or circular depending on the type of section 300 may be coupled with. For example, if the desired use is to provide a second grinding chamber, the inner edge of the wall may be circular to enable rotation and therefore further grinding of the contents.

FIGS. 4A, 4B, and 4C depict an exemplary embodiment of a top view, bottom view, and perspective view, respectively, of a screening section 400 that participates in the screening chamber 102 functionality of an octagonal-shaped embodiment of a grinding device having an internal magnetic post 100. In this embodiment, the screening section 400 is cylinder-like and hollow and is partitioned by a support bar 440 creating an upper cavity 405 and a lower cavity 406. The upper cavity 405 is surrounded by an upper wall 407 with an outer edge 410 and an inner edge 420. The inner edge 420 of the upper cavity 405 is sloped from the top of the section to the support bar 440 to facilitate movement of the ground contents towards the bottom of the section. The outer edge 410 of the upper cavity 405 is octagonal shaped and is reciprocal to the bottom of section 300.

In this exemplary embodiment, a lip 490 extends perpendicularly outward from the bottom of the upper wall 407. A lower wall 495 extends perpendicularly downward from the lip 490 creating a lower cavity 406. The lower cavity 406 has an upper surface 460 created by the slope of the inner edge 420 of the upper cavity 405 and is integrated with the bottom of the support bar 440. The shape of the inner edge 480 of the lower cavity 406 is octagonal and reciprocal to the top of section 500. The section has two apertures 430 for ground contents to pass through the screening chamber so that one or more accessories may act upon the ground contents. The outer edge 480 of the lower wall 495 is octagonal and consistent with the outer edges of the other sections of the device.

In the exemplary embodiment, a cylindrical magnet support structure 450 is integrated centrally into the support bar 440, which holds the magnet 104c that interconnects to section 300 and section 500. In this embodiment, the bottom end of the magnet 104c and the support structure 450 are flush with the bottom of the support bar 440 so that accessories may be added to the upper surface 460. Though this exemplary embodiment shows a single magnet 104c within the support structure 450, it is contemplated that more than one magnet and/or more than one support structure may be utilized depending on the intended use. For example, it may be desired to provide a greater or weaker coupling strength on one side of the section.

Figure 4E:
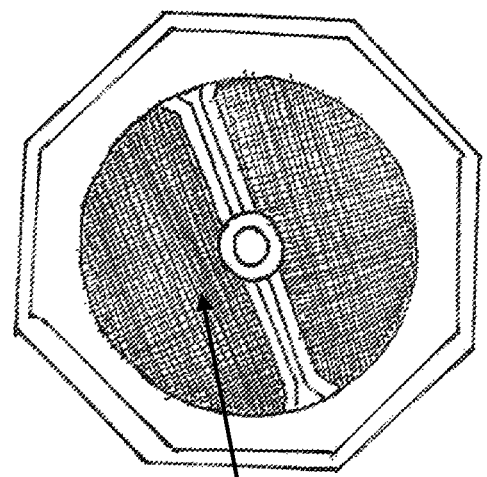
FIG. 4E is a top view of a screening section with a screen of a grinding device having sections coupled by an internal interconnected magnetic post.
Figure 4D:
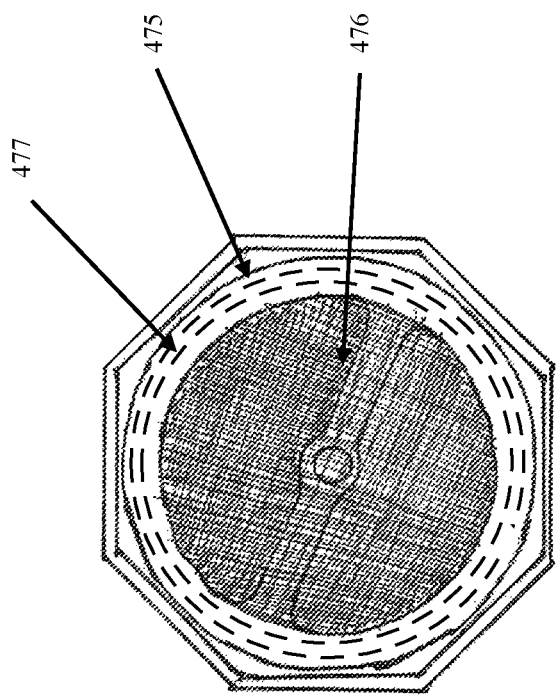
FIG. 4D is a bottom view of a screening section with a screen of a grinding device having sections coupled by an internal interconnected magnetic post.

In its embodiments, the upper surface 460 may have one or more magnets 470 integrated into the upper surface 460 for accessory attachment. The attachment of accessories is optional depending on the intended use. FIGS. 4D and 4E depict an exemplary screen accessory 475 attached to the upper surface 460 via the magnets 470 attached to section 400 depicted in FIGS. 4A and 4B. The screen accessory 475 is a disc with screen material 476 stretched across the disc. The top side of the disc has a magnetic ring 477, which is removable affixed to the magnets 470 of the upper surface 460. As contents fall through the screening chamber 400, the contents are further filtered by the screen material 476 before passing through to section 500. The screen material 476 may be made from well-known materials suitable for filtering the desired contents such as metal, metal mesh, paper, fiberglass, cotton, and the like. Though this type of accessory attachment has been described with reference to screening section 400, it is contemplated that the other sections may also employ this attached method depending on the desired use. As an example, the bottom surface 306 of multi-functional section 300 may employ additional magnets on the bottom surface 306 for attaching an accessory within that section. In other embodiments, an accessory may be secured within the cavity 550 of the multi-functional section 500. As an example, the accessory may be an additional filter which enables capturing and separating two different sizes of contents within the section 500.

Furthermore, it is contemplated that accessories may be "stacked" within the lower cavity to provide varying functionality. For example, two screens may be used to assist in separating different sized particles with the ground contents. Moreover, additional magnetic or mechanical attachments are contemplated depending on the intended use. For example, additional magnets may be placed within the inner wall of the lower cavity to secure additional accessories. In other embodiments, pins, slides, clips, or other types of attachment means may be used.

FIGS. 5A, 5B, and 5C depict an exemplary embodiment of a top view, bottom view, and perspective view, respectively, of a multi-functional section 500 of a grinding device having a magnetic internal post 100 that participates in collection and storage functionality. In this embodiment, the section 500 has a bottom edge 510 that is octagonal in shape and is flat with beveled edges 511 at the points of the octagon. A lower wall 520 maintains its octagonal shape extending upwards to a lip 530. The lip 530 perpendicularly extends inward to an outer edge 541 of an upper wall 540. The upper wall 540 extends upward to an upper surface 542 of the section 500. The upper wall 540 and lower wall 520 define a cavity 550 having a radiused bottom. A circular magnet support structure 560 is located centrally in and extends upward from the radiused bottom cavity 550. The magnet 104d is secured within the magnet support structure 560, which is reciprocal to the bottom of the magnet 104c.

In this embodiment, when section 400 is coupled to section 500, the inner edge 480 of section 400 is placed over the outer edge 541 of the upper wall 540 and rests upon the lip 530. In this embodiment, the cavity 550 collects the contents of the grinding device 100 which fall through the screening chamber 102. The cavity 550 also serves as a storage for additional accessories or tools, such as a scraping tool, used with the device 100.

Although the above description and embodiments may contain specific details, they should not be construed as limiting the claims in any way. Other configurations of the described embodiments of the invention are part of the scope of this invention. The descriptions and embodiments are not intended to be exhaustive or to limit the invention to the precise forms disclosed.

What is claimed is:

1. A grinding device comprising:
   a first section comprising a first cavity, a first plurality of teeth extending from an upper surface of the first cavity into the first cavity, and a first magnet;
   a second section removably and rotatably coupled to the first section, the second section comprising a second cavity and a third cavity, the second cavity comprising a second plurality of teeth extending from a lower surface of the second cavity into the second cavity, a plurality of holes extending through the lower surface of the second cavity to an upper surface of the third cavity, and a second magnet;
   a third section removably coupled to the second section, the third section comprising a hollow inner surface, at least one support member extending across the inner surface defining at least two apertures, and a third magnet;
   a fourth section removably coupled to the third section, the fourth section comprising a fourth cavity and a fourth magnet,
   wherein the first, second, third, and fourth sections are axially interconnected by the first, second, third, and fourth magnets such that the first, second, third, and fourth magnets located within their respective sections are situated along an axis running through all the sections.

2. The grinding device of claim 1, wherein the first, second, third, and fourth sections each comprise an octagonal outer wall.

3. The grinding device of claim 1, further comprising a screen removably attached within the third section.

4. The grinding device of claim 3, wherein the screen is attached with at least one magnet.

5. The grinding device of claim 1, wherein the first and second pluralities of teeth are trapezoidal in shape with sides that are curved inward.

6. The grinding device of claim 1, wherein the first pluralities of teeth are positioned in an opposing direction to the second pluralities of teeth when the first and second sections are coupled.

7. The grinding device of claim 1, wherein the first pluralities of teeth and the second pluralities of teeth are arranged in concentric circles within their respective sections.

8. The grinding device of claim 1, wherein the fourth cavity is a radiused bottom.

9. The grinding device of claim 1, wherein a bottom edge of the first section and a top edge of the second section is circular.

10. The grinding device of claim 1, wherein the bottom edge of the second section, a top edge of the third section, a bottom edge of the third section, and a top edge of the fourth section are octagonal shaped.

11. The grinding device of claim 1, wherein each magnet is secured in a cylindrical support structure within each section.

12. A grinding device comprising:
    a top section and a bottom section; and
    a plurality of middle sections wherein a first middle section from the plurality of middle sections is operatively coupled to the top section and a second middle section from the plurality of middle sections is operatively coupled to the bottom section,
    wherein all the sections are interconnected by an internal axially positioned magnet within each section such that each magnet within each section is situated along an axis running through all the sections, and wherein each coupling of two sections forms a chamber whose functionality is chosen from the group of grinding chamber, screening chamber, storage chamber, collection chamber, a dual-purpose chamber, and a functionless chamber.

13. The grinding device of claim 12, wherein a lower edge of the top section and an upper edge of the first middle section are circular.

14. The grinding device of claim 12, wherein at least one of the middle sections has a non-circular bottom inner edge and wherein at least one of the middle sections has a non-circular top outer edge.

15. The grinding device of claim 12, wherein the device comprises two grinding chambers.

16. The grinding device of claim 12, wherein at least one screening chamber comprises a removable screen.

17. A method of grinding contents comprising the steps of:

axially interconnecting a first magnet surface within a first cavity of a first section to a second magnet top surface within a second cavity of a second section, the first cavity having a first plurality of teeth and the second cavity having a second plurality of teeth;

axially interconnecting a second magnet bottom surface within a third cavity of the second section to a third magnet top surface within a fourth cavity of a third section;

axially interconnecting a third magnet bottom surface within the fourth cavity of the third section to a fourth magnet within a fifth cavity of a fourth section; and rotating the first section thereby grinding the contents in the first cavity.

18. The method of claim 17, further comprising the step of screening the contents within the fourth cavity.

19. The method of claim 18, further comprising the step of attaching a screen to the third section.

20. The method of claim 17, wherein rotation of the second section, the third section, and the fourth section is prevented due to a first non-circular bottom edge of the second section, a second non-circular bottom edge of the third section, a first non-circular top edge of the third section, and a second non-circular top edge of the fourth section.

\* \* \* \* \*